United States Patent
Klose (10) Patent No.: US 11,835,467 B2
(45) Date of Patent: Dec. 5, 2023

(54) THZ MEASURING DEVICE AND THZ MEASURING METHOD FOR DETERMINING DEFECTS IN MEASURING OBJECTS

(71) Applicant: INOEX GMBH INNOVATIONEN UND AUSRÜSTUNGEN FÜR DIE EXTRUSIONSTECHNIK, Melle (DE)

(72) Inventor: Ralph Klose, Melle (DE)

(73) Assignee: INOEX GMBH INNOVATIONEN UND AUSRÜSTUNGEN FÜR DIE EXTRUSIONSTECHNIK, Melle (DE)

( * ) Notice: Subject to any disclaimer, the term of this patent is extended or adjusted under 35 U.S.C. 154(b) by 322 days.

(21) Appl. No.: 17/276,293

(22) PCT Filed: Aug. 28, 2019

(86) PCT No.: PCT/DE2019/100778
§ 371 (c)(1),
(2) Date: Mar. 15, 2021

(87) PCT Pub. No.: WO2020/057689
PCT Pub. Date: Mar. 26, 2020

(65) Prior Publication Data
US 2022/0057333 A1    Feb. 24, 2022

(30) Foreign Application Priority Data

Sep. 19, 2018    (DE) .......................... 102018122965.8

(51) Int. Cl.
*G01N 21/88* (2006.01)
*G01N 21/3581* (2014.01)

(52) U.S. Cl.
CPC ..... *G01N 21/8806* (2013.01); *G01N 21/3581* (2013.01); *G01N 21/8851* (2013.01)

(58) Field of Classification Search
CPC .......... G01N 21/8806; G01N 21/3581; G01N 21/8851
See application file for complete search history.

(56) References Cited

U.S. PATENT DOCUMENTS

| | | | |
|---|---|---|---|
| 9,423,358 | B1 | 8/2016 | Hunt |
| 10,514,336 | B2 | 12/2019 | Thiel |

(Continued)

FOREIGN PATENT DOCUMENTS

| | | | |
|---|---|---|---|
| DE | 102010003239 A1 | | 9/2011 |
| DE | 102011051071 A1 | | 12/2012 |

(Continued)

OTHER PUBLICATIONS

International PCT Search Report for PCT/DE2019/100778 dated Nov. 18, 2019, 6 pages.

(Continued)

*Primary Examiner* — Jamil Ahmed
(74) *Attorney, Agent, or Firm* — Barnes & Thornburg LLP (57) ABSTRACT

The invention relates to a preferably portable THz measuring apparatus (1) for determining impurities (3) in a, in particular, stationary measured object (2), the THz measuring apparatus (1) comprising:
an antenna array (4) including at least one active THz transmitter, e.g. transceiver (12), emitting a THz transmission beam (15) along an optical axis (A), and
a plurality of THz receivers (14), arranged under a fixed spatial arrangement in relation to the THz transmitter (12) and synchronised with the THz receiver, detect reflected THz radiation (16) and putting out THz measuring signals (S1),
a controller device (5), receiving the THz measuring signals (S1) and determining impurities (3) as reflec- (Continued)

tions having occurred outside ordinary boundary surfaces (2a, 2b) of the measured object (2).
Hereby, the THz-Receiver (14) may also transmit temporarily, in particular alternatingly. The user can adjust the measuring apparatus, whereby the position can be determined by an accelerometer (18) and temporal integration so as to obtain further measuring data.

19 Claims, 3 Drawing Sheets

(56) References Cited

U.S. PATENT DOCUMENTS

| | | | |
|---|---|---|---|
| 10,584,957 | B2 | 3/2020 | Thiel |
| 10,753,727 | B2 | 8/2020 | Klose |
| 10,753,866 | B2 | 8/2020 | Klose |
| 2013/0204101 | A1 | 8/2013 | Rumberg |
| 2018/0143311 | A1 | 5/2018 | Melamed |
| 2019/0331594 | A1 | 10/2019 | Klose |
| 2020/0397336 | A1* | 12/2020 | Sherry ................. G02B 21/367 |

FOREIGN PATENT DOCUMENTS

| | | |
|---|---|---|
| DE | 102012100745 A1 | 8/2013 |
| DE | 102014214046 B3 | 10/2015 |
| DE | 102015122205 A1 | 6/2017 |
| DE | 102016101566 A1 | 8/2017 |
| DE | 102016105599 A1 | 10/2017 |
| DE | 102016111044 A1 | 12/2017 |
| DE | 102016119728 A1 | 4/2018 |
| JP | 2014132437 A | 7/2014 |
| JP | 2018054392 A | 4/2018 |
| KR | 20160149429 A | 12/2016 |
| WO | 2017215712 A1 | 12/2017 |
| WO | 2018072789 A1 | 4/2018 |

OTHER PUBLICATIONS

Neiers X et al. "Rapid control of machined glass fiber reinforced plastics by single shot terahertz time domain spectroscopy" 2015 40th International Conference on Infrared, Millimeter, and Terahertz Waves (IRMMW-THZ), IEEE, Aug. 23, 2015 (Aug. 23, 2015), pp. 1-2.

* cited by examiner

THZ MEASURING DEVICE AND THZ MEASURING METHOD FOR DETERMINING DEFECTS IN MEASURING OBJECTS

CROSS REFERENCE TO RELATED APPLICATIONS

This application is a U.S. national stage application under 35 U.S.C. § 371(b) of International Application No. PCT/DE2019/100778 filed Aug. 28, 2019, which claims priority to the German Patent Application No. 102018122965.8 filed on Sep. 19, 2018, the disclosures of both of which are hereby expressly incorporated by reference in their entirety.

The invention relates to a THz measuring apparatus and a THz measuring method for detecting impurities in measured objects. Such measured objects may be made, in particular, from a plastics material but also from another material such as ceramics, concrete or paper that is generally permeable to THz radiation. Impurities may be, in particular, cavities, i.e. empty holes formed in manufacturing, but also cracks, gaps, as well as inclusions of other materials, e.g. metal splinters.

In THz measuring measured objects THz radiation, in particular electro-magnetic radiation in a frequency range of 0.01-10 THz is utilised, emitted from a THz transceiver towards the measured object; thus, the emitted electromagnetic radiation may be, in particular, even in the microwave range. The THz radiation beamed onto the measured object is partially reflected on boundary surfaces of the measured object, i.e. upon transition between mediums of differing refraction indices. Thus, by virtue of the partial reflections, layer thicknesses can be determined and, for example, air inclusions on their boundary surfaces may be detected; metal splinters can be detected by the complete reflection of the THz radiation.

In principle, the THz transceiver may be designed to be optical, for example by means of direct run-time measurement of the emitted THz-transmission beam and the reflected THz radiation. Further, fully electronic THz measuring systems are known, wherein a dipole antenna generates the THz radiation as transceiver and receives the reflected THz radiation. Hereby, in particular, a frequency modulation may be utilised or pulsed THz radiation may be emitted.

In phased array measuring systems further THz receivers, for example passive THz dipole antennas, are connected to the actively transmitting THz transceiver so that THz radiation reflected not perpendicularly to the THz transceiver can be detected, too; accordingly, the THz transceiver and the THz receiver are synchronised with one another, so as to enable a matching of the transmission time for a distance measurement as a run-time measurement or frequency modulation.

A determination of impurities is provided, in particular, directly after making plastic pipes or plastic sheets, in that the measured objects are guided past stationary THz measuring apparatuses, e.g. measuring tubes. However, generally, it is hardly possible to determine impurities, for example including material fatigue and gashes, with stationary measured objects using such stationary THz measuring apparatuses.

The invention is based on the object of creating a THz measuring apparatus and a THz measuring method for determining impurities in measured objects method allowing secure detection with relatively little expenditure.

This task is solved by a THz measuring device and a THz measuring method according to the independent claims.

Preferred further developments are described in the subclaims. The THz measuring method shall be carried out, in particular, using the THz measuring apparatus; the THz measuring apparatus is provided, in particular, for carrying out the THz measuring methods.

Accordingly, a THz measuring apparatus including at least one active THz transmitter and a plurality of at least temporarily passive THz receivers is provided. Hereby, the THz transmitter and the THz-Receiver are designed to be fully electronic, i.e. as dipole antennas, thus forming an antenna array.

Der THz transmitter may be, in particular, a THz transceiver, i.e. designed as a combined transmitter and receiver device.

The controller device receives the THz measuring signals and determines impurities as reflections occurring outside ordinary boundary surfaces of the measured object; this means that the controller device receives the THz measuring signals and determines reflections that have occurred outside the ordinary boundary surfaces of the measured object and rates these as impurities.

Thus, the THz transmitter which is arranged, for example, in the middle of the antenna array emits the THz transmission beam along an optical axis, in particular, with an emission cone surrounding the optical axis. The THz radiation can be reflected on impurities and, at least in part, be reflected back in the direction of the antenna array so that one of the THz receivers or the THz transmitter designed as a THz transceiver itself will receive the reflected radiation.

Hereby, the measuring signal of the THz transmitter may initially serve to carry out a layer thickness measurement of the measured object. The varied times of incidence of the reflected radiation with the receivers can be utilised to determine the angle and thereby the distance and position of the reflection source in space. Thus, a curved surface of an impurity as will be present, for example, in the event of air inclusions, will reflect the THz transmission beam as a wave front towards the antenna array, and several THz receivers and possibly the THz transceiver itself may each receive a reflection peak so that the position and shape of the surface of the impurity may already be determined or estimated with higher accuracy from the run-times or, respectively, relative temporal shifts in relation to one another. Hereby, the antenna array may initially be designed as a linear sensor strip so that its extension or, respectively, lateral width determines the angle of the detectable reflected THz radiation.

This results in the additional advantage that especially curves of the impurity can be reproduced very well because the plurality of adjacent THz-receivers allow for an estimation or triangulation from a plurality of reflection peaks.

Acceding to a further development the THz-Receiver function, at least at times, also as transmitters, i.e. in particular, temporarily as THz transceivers. Thus, an antenna array is formed in which several THz transceivers are, for example, are stringed together as a sensor strip. Each THz transceiver will temporarily emit the THz transmission beam along its optical axis, preferably perpendicular to the sensor strip, towards the measured object, whereby, then, the other THz transceivers function passively as THz receivers. Thus, the THz array may be operated, in particular, alternatingly with interchanging active operation of the THz transceivers.

Hereby alone, a high number of measuring signals can be attained because different THz transmission beams, in particular emitted in parallel each having an emission cone, are transmitted towards the measured object, thereby allowing for a multiplicity of measurements to be captured. Thus, curved surfaces may be located in space in a three-dimensional fashion. Hereby, the additional expenditure in terms of hardware for temporarily operating the further antenna dipoles as active THz transceivers is relatively small.

A further advantageous embodiment is achieved by a two-dimensional design of the antenna array. Hereby, for example, two inter-crossed sensor strips may be utilised, for example, having an angle of 90° between the sensor strips. Here, again, for example, only the middle antenna dipole may be used as active THz transceiver, and the further antenna dipoles may be designed as passive THz receivers. Advantageously, however, all antenna dipoles are again temporarily active THz transceivers and, correspondingly, temporarily merely passive.

B virtue of such an embodiment alone, a depth image of the impurities can be detected. Thus, it is possible, for example, for one thing, to securely capture and measure the measured object with its outer boundary surfaces, and, further, to capture the position, orientation and progression of an impurity such as, for example, of a cavity in the measured object and even visualise the same e.g. on a display, in particular, an external display device of a connected computing device. Thus, it is possible to evaluate not only the position of a cavity inside the material but also the volume.

Such a two-dimensional array arrangement may comprise e.g. merely two inter-crossing sensor strips; in principle, it is possible to form a 2D matrix of antenna arrays. It is apparent, however, that the excess expenditure in hardware of a full 2D arrangement compared to the inter-crossing sensor strips does not bear a clear advantage; the two inter-crossing sensor strips alone allow for a good two-dimensional detection with a relatively small number of dipole antennas.

A further advantage is attained by the combination with an accelerometer device, in particular, accelerometers for three-dimensional detection of accelerations, i.e. in the three spatial directions. Thus, the controller device is capable, on the one hand, of receiving the THz measuring signals of the individual THz transceivers, and, on the other, of evaluating these in combination with the acceleration signals. Thus, by means of temporal integration of the acceleration signals, three-dimensional positions in space can be allocated to the measuring signals.

It is possible, in particular, to create a portable THz measuring apparatus allowing the user to carry out very precise measurements preferably by handling and adjusting the measuring apparatus, in particular, guiding it along the measured object. Hereby, the THz measuring apparatus is portable at least by its antenna array, its portable part comprising a handle region for grabbing by the user and positioning at various positions in front of the measured object The controller device determines the respective three-dimensional position of the THz measuring apparatus in relation to the measured object from the acceleration signals and can thereby associate the plurality of measuring signals with the points. Thus, when the THz measuring apparatus detects a possible impurity, the user can use the apparatus to measure the area in question more thoroughly and, for example, adjust the THz measuring apparatus translationally or rotate and pivot it, so as to capture further measuring signals. Thus, a cavity, once detected, can be subsequently captured more precisely including precise detection of the curvature of its surface and therewith the orientation and volume. Thus, it is also possible to have the array being made of inter-crossed sensor strips, being a simple and easy to handle apparatus, supply a suitable number of measuring signals, like a more hardware-intensive and costly 2D matrix arrangement.

According to a further development, an optical camera, in particular an RGB camera, may be additionally attached to the measuring apparatus, thereby supplying additional image signals which are also evaluated and combined by the controller device. Thus, it is possible to display, in particular, on a connected display device, an image of the measured object corresponding to the image signals and to augment the same using the supplementary information gathered from the THz measuring signals.

Using such imagery it is possible, even when measuring a measured object merely from one side, to display, for example the front side and the backs side because these boundary surfaces can be securely determined by the THz radiation, and further to display the position and arrangement of the impurities so that the user may, for example, place a marker on the work piece showing the position and size of the impurity.

Thus, moving the measuring apparatus does not lead to measurement inaccuracy but to further measuring information which can be evaluated as further measurements from other spatial positions and utilised for a more precise determination of impurities.

Further, it is also possible to evaluate the amplitude of the THz measuring signal so as to determine the height of the amplitude of the measuring peaks of an impurity and associate it with a magnitude or, respectively, the surface covered by the impurity. Thus, e.g. the surface area of the impurity can be determined, in particular, also by means of measurements in a plurality of pivoted orientations of the THz measuring apparatus.

Thus, it is possible to emulate and even visualize on a display a complete 3D model of the work piece including its boundary surfaces, formation and extent of its impurities.

Besides an application in, for example, the extrusion of plastic articles such as plastic pipe and plastic sheets, the measuring apparatus can be utilise, in particular, also in subsequent material testing. Thus, rotors of wind energy installation can be measured securely and precisely as static measured objects using a portable measuring apparatus. It is possible, in particular, to detect hair cracks and delamination as impurities, e.g. via the air pockets in the hair cracks and delamination, and to determine the sizes thereof. Further, pipe bursts can be detected from outside. Also, for example, metal pipes can be captured in an environment of plastics or stoneware.

The invention will be illustrated below by means of the accompanying drawings by means of certain embodiments. It is shown in.

Figure 1:
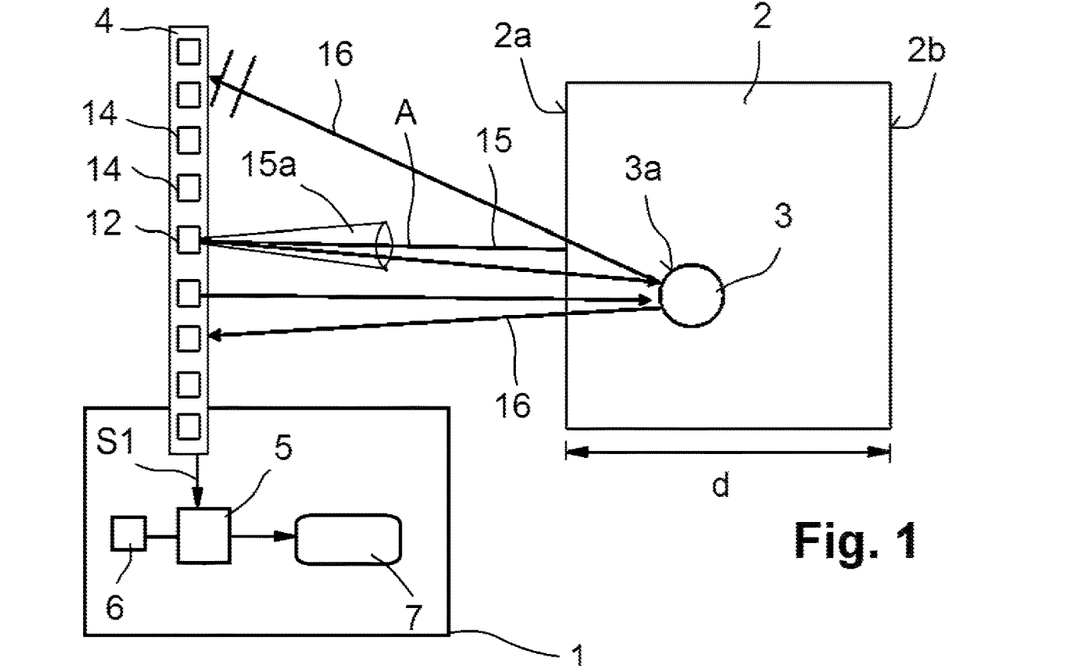
FIG. 1 the measuring of a measured object using a measuring apparatus according to a first embodiment, represented in one measuring plane.

According to FIG. 1, a THz measuring apparatus 1 is provided for measuring a stationary measured object 2, for example, made of plastics or of a ceramics or stoneware material. The measured object 2 has boundary surfaces 2a, 2b, for example, a front side 2a and a back side 2b. Inside the measured object 2 impurities 3, for example, as shown in FIG. 1, as shrinkage cavities (empty space) invisible from the outside or even cracks and gaps may be formed, for example, on the back side 2b not directly visible to the user from the front side.

The THz measuring apparatus 1 is provided with an antenna array 4, further with a controller device 5, an internal memory 6, as well as an output means 7. The output means may be, for example, an optical display means 7 for visualising the measured object 2 and of the impurities 3, and/or an acoustic display which outputs a signal, for example, when an impurity 3 is detected.

Figure 5:
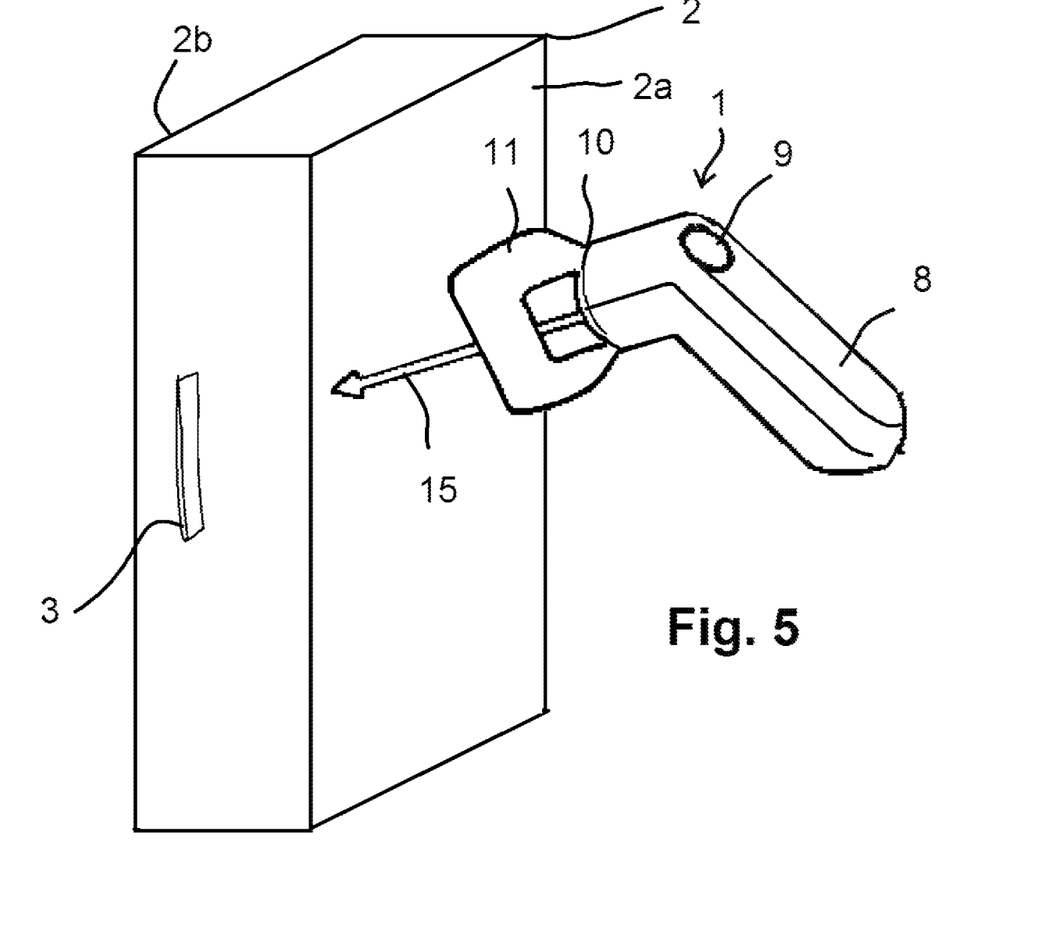
FIG. 5 the measuring of a wall as measured object using a portable measuring apparatus.

Moreover, advantageously, the THz measuring apparatus 1 comprises a handle region 8, shown in FIG. 5, for grabbing by the user, an actuator means 9, and, on a front end region 10, a contact contour 11 or contour lines respectively for making contact Anlage with the boundary surfaces, i.e. the front side 2a and potentially the back side 2b of the measured object 2.

According to the embodiment of FIG. 1, the antenna array 4 is provided primarily as transmitter with a middle transceiver 12 which is designed as a dipole antenna and emits a THz transmission beam 15 along its optical axis A. The antenna array 4 further comprises a plurality of receivers 14 which are correspondingly designed as dipole antennae and detect THz radiation 16 reflected from the measured object 2. The transceiver 12 and the receivers 14 are synchronised with each other or via the controller device 5 respectively so that transmission and reception times can be compared.

The THz transceiver 12 sends out THz radiation, generally within a frequency range between 0.01 THz and 10 THz, in particular, frequency modulated or pulsed, however, direct run-time measurements are also possible. Thus, a THz transmission beam 15 is emitted along an optical axis A towards the measured object 2 and partially reflected on the boundary surfaces 2a, 2b, for measuring distances, in particular, a thickness d of the measured object 2 as distance of the boundary surfaces 2a, 2b in relation to each other, when the optical axis A is positioned perpendicular to the boundary surfaces 2a, 2b.

Figure 6:
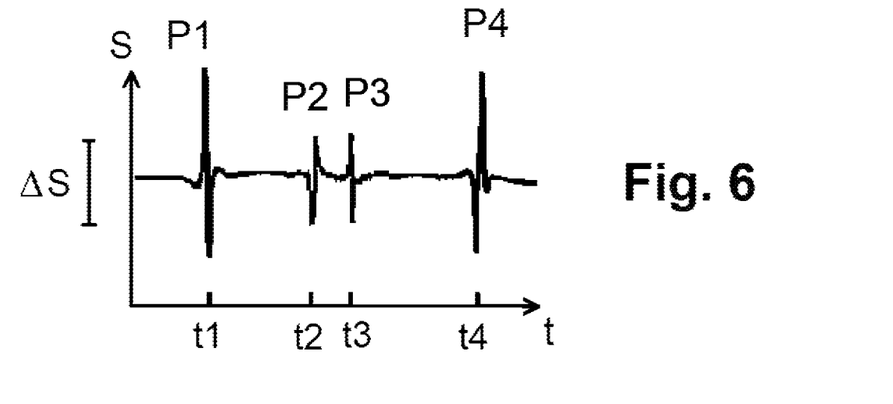
FIG. 6 an example of a signal diagram of a THz measuring signal.

FIG. 6 shown in exemplary fashion a signal diagram of a measurement, where a signal amplitude S is plotted as a function of time t, where a first measuring peak P1 is determined at time t1 upon entry of the THz transmission beam 15 into the front boundary surface 2a, and, at a later time t4 a measuring peak P4 is determined upon the THz radiation exiting the rear boundary surface 2b. Thus, by means of this measurement in the time domain, it is possible to associate a temporal difference t4–t1 to the thickness d of the measured object 2, in a manner known as such. A measurement and evaluation may be carried out in a similar fashion with frequency modulation.

Der THz transceiver 12 emits the THz transmission beam 15 within a cone of radiation emitted 15a around the optical axis A so that radiation is emitted also at an inclination with respect to the optical axis A which, accordingly, does not lead to a measuring signal with orthogonal positioning of the optical axis A on the boundary surfaces 2a, 2b at the THz transceiver 12 itself. However, the THz transmission beam 15 will be reflected in various directions, in particular, on irregular boundary surfaces, such as, for example, a curved surface 3a of the shrinkage cavity 3 drawn in as impurity, so that, for one thing, the THz transceiver 12 itself and, furthermore, also at least one or some of the THz receiver(s) 14 receive reflected THz radiation 16 which has not been reflected from the boundary surfaces 2a, 2b.

Figure 3:
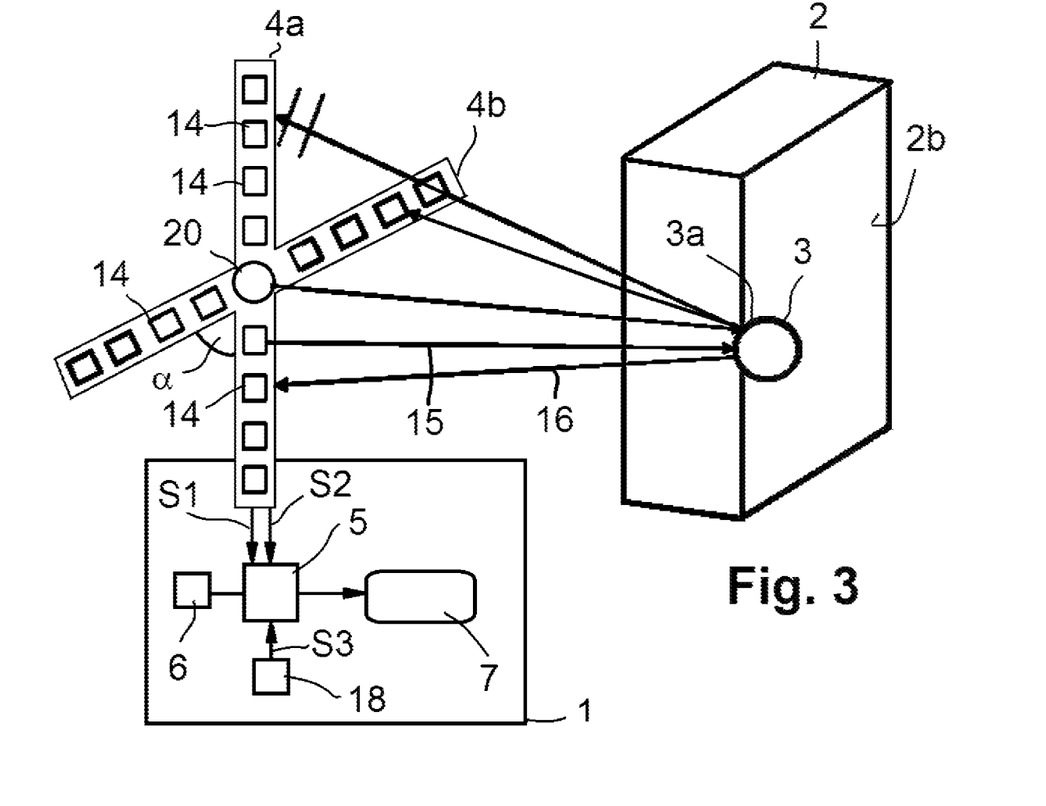
FIG. 3 a perspective view of the measuring of a measured object using a measuring apparatus according to a further embodiment with an additional RGB camera.

In FIG. 3, a shrinkage cavity, occurring e.g. in a casting process, is shown as impurity 3; according to e.g. FIG. 5, an impurity 3 may also occur as a hair crack or delamination respectively in the plastics material and as such be detected due to the additionally formed boundary surfaces, i.e. in particular, as an air inclusion.

In FIG. 6, by way of example, measuring peaks P2 and P3 are plotted at the times t2 and t3 which are generated upon entry into and exit from impurity 3. The thickness of the impurity 3, i.e. the extent in the direction of the THz transmission beams, results from the time difference t3–t2; the position of the impurity 3 in the measured object 2 can be determined by the distances to the boundary surfaces 2a and 2b, i.e. by means of the time differences t4–t3 as well as according to t2–t1. Further, preferably, the height of the signal amplitude S may be evaluated also, where the height ΔS of the signal amplitude may be interpreted as surface extent or, respectively, size of the impurity perpendicular to the THz transmission beam.

Initially, the not yet precise position of the impurity 3 is determined from the measuring signal of an individual receiver 14, and further, likewise, not its size and shape; initially, a total run-time of the THz radiation as path of the THz transmission beams 15 and the reflected THz radiation 16 back to the receiver 14 is determined so that for a reflection peak in the measuring signal the points where the reflection may have occurred generally lie inside an ellipse whose focal points are determined by the THz transceiver 12 and the THz-Receiver 14. A linear antenna array 4 with a middle THz transceiver 12 and adjacent THz receivers 14 alone allows several measuring signals to be captured so that a course estimate of the impurity 3 can be obtained.

The antenna array 4 according to FIG. 1 advantageously comprises not only one active THz transceiver 12; rather, it may comprise a plurality of THz transceivers 12, where, advantageously, the THz receivers 14 may also be designed temporarily as transceivers. Thus, for example, the active function of the THz transceivers 12 may be alternatingly connected through so that always one of the dipole antennae is active and puts out the THz transmission beam 15 while the other dipole antennae passively receive reflected THz radiation 16. Accordingly, FIG. 1 depicts by way of example a second THz transceiver 12 for emitting a THz transmission beam 15.

Thus, such a design of an antenna arrays 4 with alternating function of the active THz transceiver 12 alone allows the THz transmission beam 15 to be irradiated against the measured object 2 and the impurity 3 from different directions or angles respectively, and the reflected radiation 16 to be detected accordingly by each differently positioned passive receivers so that, in the plane shown in FIG. 1, an improved measuring of the boundary surfaces 3a of the shrinkage cavity 3 is possible.

Hereby, the THz transmission beam 15, starting from the THz transceiver 12 through air or the environment respectively, arrives initially at the first boundary surface, i.e. the front side 2a, whereby, here, a small portion of the intensity of, for example, 2-5% is reflected and the vast majority penetrates the measured object 2. Accordingly, when a cavity is present as impurity 3, a portion of the THz transmission beam 15 is reflected again at the boundary surface 3a thereof which surrounds, for example, a interior gas or air as inclusion so that THz radiation 16 is reflected back and may be detected by a suitably positioned THz-Receiver 14. Furthermore, the THz transmission beam 15 also penetrates the shrinkage cavity and is partially reflected at the back side of the shrinkage cavity, i.e. upon re-entry from the shrinkage cavity 3 into the material of the measured object 2 so that here, too, THz radiation 16 is reflected back. Thus, by means of such a measurement it is possible to cover not only a front region but also a back region of the shrinkage cavity 3, whereby multiple reflection are generally rather weak so that the boundary surfaces can be detected directly.

Figure 2:
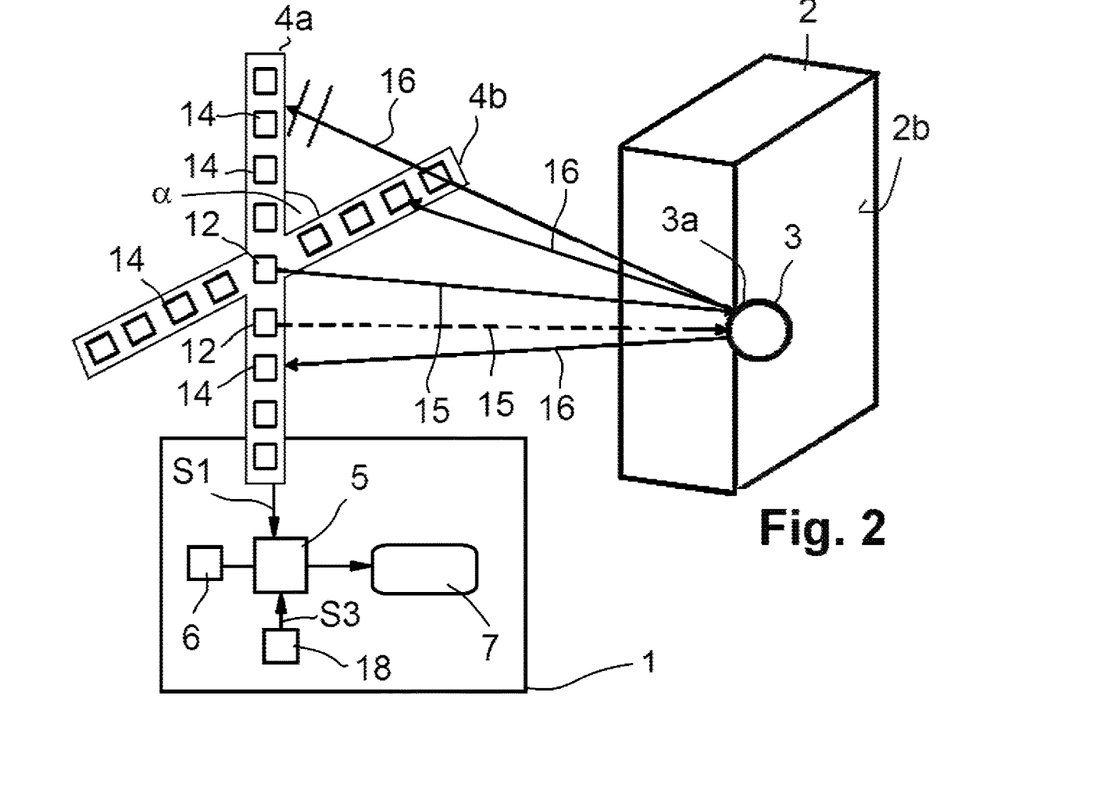
FIG. 2 a perspective view of the three-dimensional measuring of a measured object using a THz measuring apparatus according to an embodiment.

According to the design of FIG. 2, advantageously, the antenna array 4 is designed not only linear but having a two-dimensional extension, i.e. as a 2D antenna array. To that end, according to FIG. 2, two linear designs, i.e. two non-parallel sensor strips 4a, 4b, may be provided which are preferably oriented at an angle α of 90° in relation to one another thereby generating a plane, e.g. with a middle THz transceiver 12. Thus, if only the middle dipole antenna is designed as active THz transceiver 12, the further THz receivers 14 can detect in two dimensions or two directions respectively so that, accordingly, a three-dimensional covering of the boundary surface 3a of the impurity 3 is rendered possible already. Accordingly this will create a depth field image of the impurity 3.

In the embodiment of FIG. 2, too, advantageously, the dipole antennae of each sensor strip 4a, 4b may each be active and each put out a THz transmission beam 15 as THz transceiver 12, and each passively receive reflected radiation 16 as a pure THz receiver 14. Thus, in each case, a single dipole antenna as THz transceiver 12 may transmit actively and the further dipole antennae work as passive receivers 14.

A THz measuring signal S1 obtained in this manner can be evaluated accordingly by the controller device 5 for generating a three-dimensional image of the measured object 2 and the position of the impurity 3 in the measured object 2, i.e. the relative position of the impurity 3, its extension and size.

Further, according to FIG. 2, an accelerometer 18 may be provided in addition, preferably covering acceleration in three spatial directions for capturing any acceleration. Thus, when the user handles and moves the THz measuring apparatus 1, the accelerometer 18 can measure the acceleration in the three spatial directions so that the three spatial directions signals S3 can be temporally integrated in the controller device 5. The accelerometer can measure translational acceleration or even rotational acceleration. Thus, a translational adjustment, and also rotational movement or pivoting motion of the THz measuring apparatuses 1 can be captured.

Thus, the user can handle and move the THz measuring apparatus 1 and carry out measurements continuously so that the controller device 5 can allocate the measuring signals S1 always to the current positions of the THz measuring apparatus and thereby the antenna array 4. Thus, assuming a stationary measured object 2, the accuracy of the measurement can be increased by handling the THz measuring apparatus 1 because continued measurements are carried out from a plurality of measuring positions and a plurality of pivot positions.

Thus, an exact three-dimensional capture of the measured object 2 and its impurities 3 is enabled. Thus, the entire measured object 2 and its impurities 3 can be displayed on the output means 7, for example as a corresponding graphical three-dimensional representation. To that end, the output means 7 may also be provided outside the portable THz measuring apparatus 1. When a possible impurity 3 is displayed on the output means 7 the user can readjust the THz measuring apparatus 1 accordingly or, respectively, adjust it further to that position and increase the accuracy of the measuring data, for example, by scanning the appropriate region.

According to the embodiment of FIG. 3, the THz measuring apparatus 1 may further comprise an optical camera, e.g. RGB camera 20, correspondingly capturing the environment region in front of the THz measuring apparatus 1 around the optical axis A and supplying image signals S2. Thus, the controller device 5 is able to receive the THz measuring signals S1 and the image signal S2 and process them together with the acceleration signals S3, and display a representation of the measured object 2 on the output means 7, including information such as e.g. the thickness d, with simulated or displayed position, dimensions, extension, and, if applicable, volume of the impurity 3.

Thus, the user can mark the position of the impurity 3 on the outer surface 2a of the measured object 2.

Figure 4:
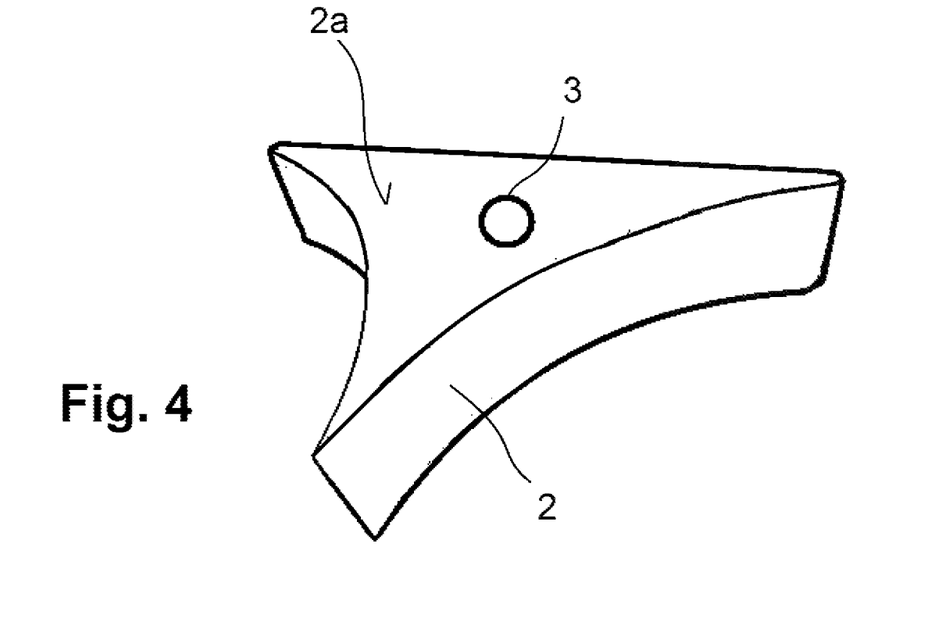
FIG. 4 an example of an irregular measured object to be measured, with a shrinkage cavity.

A user can, in particular, scan and capture a stationary measured object 2 from the outside. Even curved outside surfaces of the measured object 2, for example irregular external surfaces, such as indicated in FIG. 4 and may exist e.g. in rotor blades, can be captured by corresponding handling and scanning by means of the THz measuring apparatus 1, whereupon impurities 3 can be detected, subsequently scanned more accurately, evaluated and displayed.

The THz measuring apparatus 1 may be positioned with its contour lines 11 on the outside surface 2a. Further, the THz measuring apparatus 1 may also be held at a distance from the measured object 2 and pivoted so as to allow better capturing of the impurities 3.

As indicated in FIG. 3, shrinkage cavities can be detected as impurities 3. Furthermore, porosities and cracks generated according to FIG. 5 by material fatigue, in particular hair cracks in den boundary surfaces or, respectively, delamination, can be determined as impurities. Further, for example, even picked-up metal splinters directly reflecting the THz radiation 15 can be detected.

LIST OF REFERENCE NUMERALS

1 THz measuring apparatus
2 measured object
2a front side of the measured object 2
2b back side of the measured object 2
3 impurities, shrinkage cavities
3a curved surface, boundary surface of the shrinkage cavity 3
4 antenna array
4a, 4b sensor strips of the antenna array 4
5 controller device
6 internal memory
7 output means, for example display means
8 handle region
9 actuator means
10 front end region
11 contact contour or, respectively, contour lines
12 THz transceiver
14 THz receiver
15 THz transmission beam
15a cone of radiation emitted
16 reflected THz radiation
18 accelerometer
20 optical camera (RGB camera)
A optical axis
d thickness of the measured object 2

S amplitude of the THz measuring signal S1
S1 THz measuring signal
S2 image signal of the RGB camera 20
S3 acceleration measuring signal of the accelerometer 18
t1, t2 t3, t4 points in time
P1, P2, P3, P4 measuring peaks

The invention claimed is:

1. A THz measuring apparatus for determining impurities in a measured object, comprising:
    an antenna array including at least one active THz transmitter emitting a THz transmission beam along an optical axis, a plurality of THz receivers arranged under a fixed spatial arrangement in relation to said THz transmitter and synchronised with said THz transmitter, detecting reflected THz radiation and putting out THz measuring signals, and
    a controller device, receiving said THz measuring signals and determining impurities as reflections that have occurred outside ordinary boundary surfaces of the measured object.

2. The THz measuring apparatus according to claim 1, wherein said THz transmitter is a THz transceiver detecting reflected THz radiation and putting out a THz measuring signal.

3. The THz measuring apparatus according to claim 2, wherein at least one of said THz receivers temporarily actively sends out a THz transmission beam, where always one THz receiver or said THz transceiver transmits and the other THz receivers or said THz transceiver receives.

4. The THz measuring apparatus according to claim 3, wherein a plurality of said THz receivers temporarily transmit and said THz transceiver temporarily only passively receives reflected THz radiation, in particular, with alternating switching of the active transmission function.

5. The THz measuring apparatus according to claim 1, wherein said antenna array comprises at least one sensor strip as a linear arrangement made of said at least one THz transmitter and said plurality of THz receivers with a middle arrangement of said THz transmitter.

6. The THz measuring apparatus according to claim 1, wherein it comprises two non-parallel arrangements of THz receivers, in particular, as two inter-crossed sensor strips or two-dimensional matrix arrangement of THz receivers.

7. The THz measuring apparatus according to claim 1, wherein it further comprises an accelerometer means for measuring acceleration of said THz measuring apparatus and putting out an acceleration measuring signal, for measuring acceleration in the three spatial directions and/or in one or more rotational directions, said controller device receiving said acceleration measuring signal and determining the spatial position of said THz measuring apparatus, by temporal integration carried out twice, upon transmitting and receiving said THz radiation.

8. The THz measuring apparatus according to claim 7, wherein said controller device further determining, from said THz measuring signals, boundary surfaces of said measured object and a relative position of the impurity in said measured object as well as the three-dimensional arrangement of boundary surfaces of the impurity, including the volume of the impurity.

9. The THz measuring apparatus according to claim 1, wherein said controller device evaluates a height of the amplitude of said THz measuring signal and determines, from the height of the amplitude, in particular in case of measurements in a plurality of pivoting positions and/or positions of said THz measuring apparatus, a size or captured surface of the impurity.

10. The THz measuring apparatus according to claim 1, wherein it is portable, at least with its antenna array, by a handle region for grabbing by the user and for positioning on various positions in front of or on said measured object.

11. The THz measuring apparatus according to claim 10, wherein it comprises a contact contour for contacting and defined positioning on said measured object.

12. The THz measuring apparatus according to claim 1, wherein it further comprises an optical output means for putting out a three-dimensional image of said measured object and the determined impurities, said optical output means being provided in a portable or stationary part.

13. The THz measuring apparatus according to claim 1, wherein it further comprises an optical camera for capturing the measured object and putting out image signals to said controller device, said controller device generating, from said image signals and said THz measuring signals, a three-dimensional representation of said measured object with indicated position, extension and/or shape of the impurity in said measured object.

14. A THz measuring method for determining an impurity in a measured object, where a THz measuring apparatus, comprising an antenna array including at least one THz transmitter and a plurality of THz receivers, emits a THz transmission beam towards said measured object, and said plurality of THz receivers receive THz radiation reflected from said measured object, whereby THz measuring signals are created, a determination is made from said THz measuring signals as to whether at least part of the received reflected THz radiation was reflected outside ordinary boundary surfaces of said measured object, where, additionally determined boundary surfaces in said measured object are associated with an impurity.

15. The Method according to claim 14, wherein THz radiation is detected which has been reflected in several directions, by means of inter-crossed sensor strips of an antenna arrays.

16. The Method according to claim 14, wherein said THz-Receivers temporarily actively emit said THz transmission beam and then said THz transmitter as transceiver detects THz radiation merely passively with alternating switching of transmitting said THz transmission beams, where the non-active THz receivers or the non-active THz transceiver each detect said THz radiation passively.

17. The Method according to claim 14, wherein
    at least a portable part of said THz measuring apparatus with the antenna array is adjusted by the user in relation to a stationary measured object,
    where the adjustment movements are determined by measuring the acceleration in three spatial directions,
    a relative position of said THz measuring apparatus in relation to said stationary measured object is determined by temporal integration carries out twice, and
    a position and extension of the detected impurities in said measured object is determined and displayed optically.

18. The Method according to claim 14, wherein a height of the signal amplitude of the THz measuring signals is evaluated and, from the height of the signal amplitude, in particular in case of measurement in a plurality of pivoting positions and/or positions of the THz measuring apparatus, a size or detected surface of the impurity is determined.

19. The Method according to claim 14, wherein further, said THz measuring apparatus captures an optical image of said measured object and generates an image signal, and a three-dimensional association of the THz measuring signals and the image signals is carried out by evaluating the image signal, the THz measuring signal and of the THz acceleration signal, and a three-dimensional representation of the measured object with three-dimensional representation of the positions, size and extensions of the determined impurities is put out.

\* \* \* \* \*